(12) United States Patent
Enguehard et al.

(10) Patent No.: US 11,102,169 B2
(45) Date of Patent: Aug. 24, 2021

(54) IN-DATA-PLANE NETWORK POLICY ENFORCEMENT USING IP ADDRESSES

(71) Applicant: Cisco Technology, Inc., San Jose, CA (US)

(72) Inventors: Marcel Paul Sosthène Enguehard, Paris (FR); Jordan Augé, Saint-Cyr-l'ecole (FR); Giovanna Carofiglio, Paris (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/433,225

(22) Filed: Jun. 6, 2019

(65) Prior Publication Data

US 2020/0389426 A1    Dec. 10, 2020

(51) Int. Cl.
| | |
|---|---|
| *H04L 29/12* | (2006.01) |
| *H04L 12/46* | (2006.01) |
| *H04L 12/24* | (2006.01) |
| *H04L 29/06* | (2006.01) |
| *H04L 9/30* | (2006.01) |

(52) U.S. Cl.
CPC ...... *H04L 61/2007* (2013.01); *H04L 12/4645* (2013.01); *H04L 41/0893* (2013.01); *H04L 61/6004* (2013.01); *H04L 61/6059* (2013.01); *H04L 63/0236* (2013.01); *H04L 63/102* (2013.01); *H04L 63/1425* (2013.01); *H04L 9/30* (2013.01); *H04L 63/0272* (2013.01)

(58) Field of Classification Search
CPC ............. H04L 61/2007; H04L 63/0227; H04L 63/101; H04L 63/1408; H04L 63/1425; H04L 63/1458
See application file for complete search history.

(56) References Cited

U.S. PATENT DOCUMENTS

| | | |
|---|---|---|
| 8,081,971 B2 | 12/2011 | Tan et al. |
| 8,286,002 B2 | 10/2012 | Kamat et al. |
| 8,839,388 B2 | 9/2014 | Raleigh |
| 9,948,633 B2 | 4/2018 | Khandelwal et al. |
| 10,091,176 B2 | 10/2018 | Natu et al. |
| 2003/0236897 A1 | 12/2003 | Shitano et al. |
| 2009/0041058 A1 | 2/2009 | Ikeda et al. |

(Continued)

OTHER PUBLICATIONS

International Search Report and Written Opinion from the International Searching Authority, dated Aug. 18, 2020, 11 pages, for corresponding International Patent Application No. PCT/US2020/034662.

*Primary Examiner* — Barbara B Anyan
(74) *Attorney, Agent, or Firm* — Polsinelli PC (57) ABSTRACT

The present disclosure provides a method of embedding finer grained information such as user identity and application identity in IPv6 addresses used for end-to-end communications within a network. The finer grained information can be used for improved policy enforcement within the network. In one aspect, generating an address for an end-to-end communication within a network, the address including a user identifier and an application identifier for network policy enforcement; assigning the address to an application used in the end-to-end communication; and performing network segmentation and the network policy enforcement within the network using the address.

20 Claims, 4 Drawing Sheets

(56) References Cited

U.S. PATENT DOCUMENTS

| | | | |
|---|---|---|---|
| 2011/0161665 A1* | 6/2011 | Perez | H04L 63/102 |
| | | | 713/161 |
| 2014/0025770 A1* | 1/2014 | Warfield | G06F 16/256 |
| | | | 709/213 |
| 2015/0172186 A1 | 6/2015 | Kizu | |
| 2015/0312801 A1* | 10/2015 | Khan | H04W 40/34 |
| | | | 370/235 |
| 2016/0105291 A1* | 4/2016 | Anchan | H04W 28/021 |
| | | | 370/312 |
| 2016/0164896 A1* | 6/2016 | Baldonado | H04L 63/1425 |
| | | | 726/23 |
| 2016/0173338 A1* | 6/2016 | Wolting | H04L 67/1097 |
| | | | 709/223 |
| 2018/0097831 A1* | 4/2018 | Uppal | H04L 9/30 |
| 2019/0149449 A1* | 5/2019 | Morris | H04L 45/22 |
| | | | 709/238 |

\* cited by examiner

IN-DATA-PLANE NETWORK POLICY ENFORCEMENT USING IP ADDRESSES

TECHNICAL FIELD

The subject matter of this disclosure relates in general to the field of computer networking, and more particularly, to systems and methods for network policy enforcement using IP network addresses utilized for end-to-end communications within a network.

BACKGROUND

Policy enforcement within an enterprise network is important as it directly affects security of the network against unauthorized access. Currently, network policy enforcement is based on two broad levels of identities including virtual network (VN) and Endpoint ID Group (EIG) identities. Any identification of applications for purposes of policy enforcement is complex and performed using Deep Packet Inspection (DPI) such as NBAR2 and ETA and proxying. Furthermore, network segmentation for purposes of policy enforcement relies on Overlay Networks and Encapsulation (VXLAN) which further complicates the architecture of the network. Moreover, Software Defined Wide Area Network (SD-WAN) and Software Defined Access (SDA) do not use the same VXLAN Network Identifier (VNI) size and Scalable Group Tags (SGT) do not propagate out of an access zone since they are not carried in the IPSec context header. The above introduces a lack of interoperability of packet formats for network policy enforcement.

BRIEF DESCRIPTION OF THE FIGURES

To provide a more complete understanding of the present disclosure and features and advantages thereof, reference is made to the following description, taken in conjunction with the accompanying drawings, in which.

DESCRIPTION OF EXAMPLE EMBODIMENTS

Various example embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

The present disclosure provides a unique method of embedding finer grained information such as user identity and application identity (as opposed to only the more general VN and EIG identities described above) in IPv6 addresses used for end-to-end communications within a network. The finer grained information can be used for improved policy enforcement within the network. The modified IPv6 addressed that include the finer grained information are assigned to instances of applications being used and are independent of (not tied to) end terminals and devices used to run such instances of applications.

This method provides a unique identifier for network policy enforcement across the network, a finer granularity compared to VNI/SGT for network policy enforcement and use of existing network primitives (routing, forwarding, mobility, segmentation, etc.) for network security and policy enforcement.

In one aspect of the present disclosure, a method includes generating an address for an end-to-end communication within a network, the address including a user identifier and an application identifier for network policy enforcement; assigning the address to an application used in the end-to-end communication; and performing network segmentation and the network policy enforcement within the network using the address.

In one aspect of the present disclosure, a controller includes a memory having computer-readable instructions stored therein and one or more processors configured to execute the computer-readable instructions to generate an address for an end-to-end communication within a network, the address including a user identifier and an application identifier for network policy enforcement, assign the address to an application used in the end-to-end communication and perform network segmentation and the network policy enforcement within the network using the address.

In one aspect of the present disclosure, one or more non-transitory computer-readable media have computer-readable instruction stored thereon, which when executed by one or more processors of a controller of a network, cause the one or more processors to generate an address for an end-to-end communication within a network, the address including a user identifier and an application identifier for network policy enforcement, assign the address to an application used in the end-to-end communication and perform network segmentation and the network policy enforcement within the network using the address.

DETAILED DESCRIPTION

Intent-based networking is an approach for overcoming the deficiencies of conventional enterprise networks. The motivation of intent-based networking is to enable a user to describe in plain language what he or she wants to accomplish (e.g., the user's intent) and have the network translate the user's objective into configuration and policy changes that are automatically propagated across a complex and heterogeneous computing environment. Thus, an intent-based network can abstract network complexity, automate much of the work of provisioning and managing the network typically handled by a network administrator, and assure secure operation and optimal performance of the network. As an intent-based network becomes aware of the users, devices, and things making connections in the network, it can automatically apply security permissions and service levels in accordance with the privileges and quality of experience (QoE) assigned to the users, devices, and things. Table 1 sets forth examples of intents and workflows that can be automated by an intent-based network to achieve a desired outcome.

TABLE 1

Examples of Intents and Associated Workflows

| Intent | Workflow |
| --- | --- |
| I need to scale out my application database | Extend network segments; update load balancer configuration; configure quality of service (QoS) |
| I have scheduled a telemedicine session at 10am | Create high-definition (HD) video connection; prioritize with end-to-end QoS; validate performance; keep the communication safe; tear down connection after call |
| I am rolling out a new IoT app for factory equipment monitoring | Create a new segment for all factory devices to connect to the IoT app; isolate from other traffic; apply service level agreement (SLA); validate SLA; optimize traffic flow |
| I need to deploy a secure multi-tier application | Provision multiple networks and subnets; configure access control lists (ACLs) and firewall rules; advertise routing information |

Some additional examples of use cases of an intent-based network:

An intent-based network can learn the performance needs of applications and services and adapt the network from end-to-end to achieve specified service levels;

Instead of sending technicians to every office, floor, building, or branch, an intent-based network can discover and identify devices and things as they connect, assign security and micro-segmentation profiles according to established policies, and continuously monitor access point performance to automatically adjust for QoE;

Users can move freely among network segments, mobile device in hand, and automatically connect with the correct security and access privileges;

Switches, routers, and other network devices can be powered up by local non-technical office personnel, and the network devices can be configured remotely (by a user or by the network) via a cloud management console with the appropriate policies as defined by the intents for the specific location (e.g., permanent employee access, visiting employee access, guest access, etc.); and Machine learning and artificial intelligence agents running in the network can continuously monitor and analyze network traffic and connections, compare activity against pre-defined intents such as application performance or security policies, detect malware intrusions in encrypted traffic and automatically isolate infected devices, and provide a historical record of network events for analysis and troubleshoot.

Figure 1:
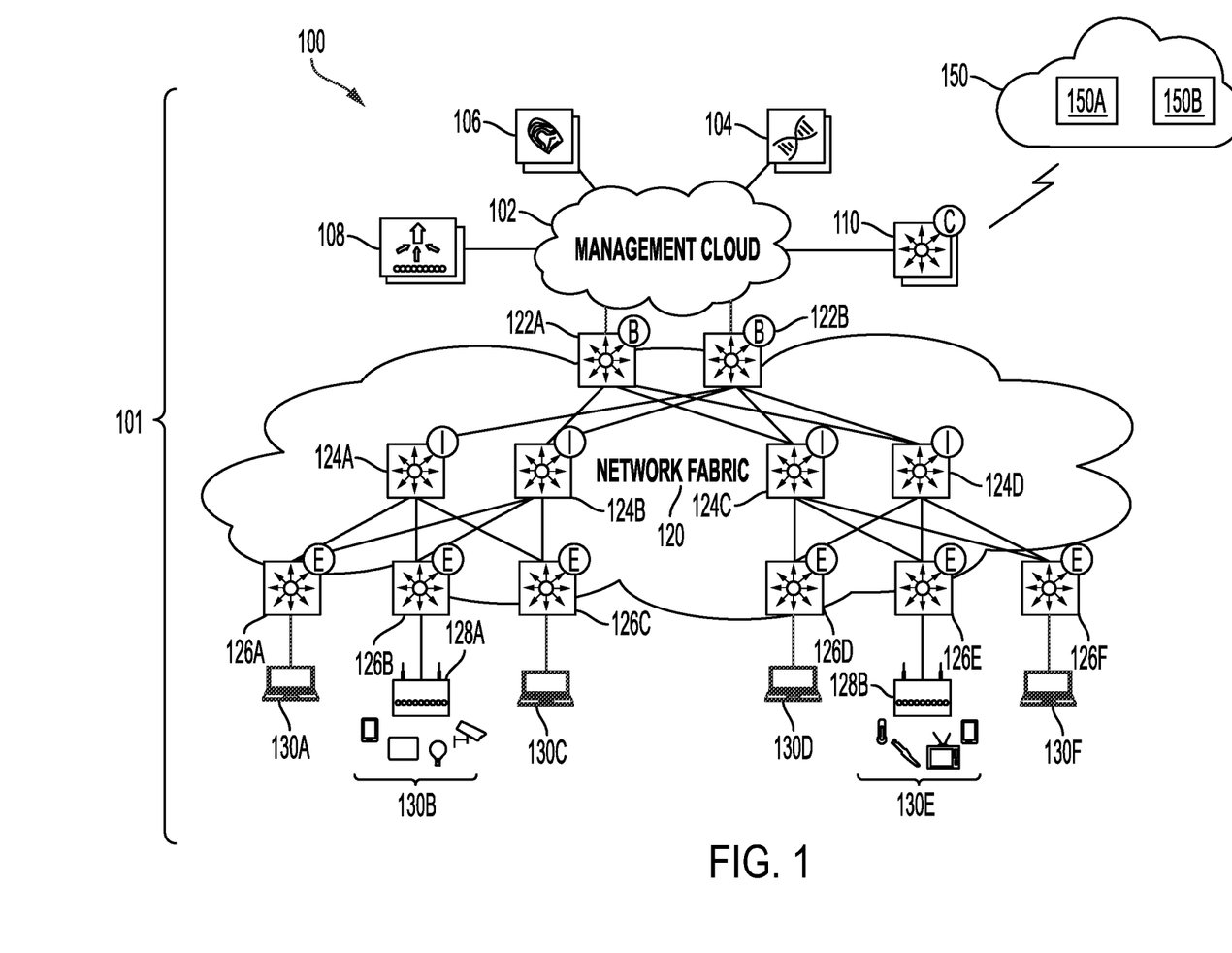
FIG. 1 illustrates an example setting of a physical topology of an enterprise network, according to one aspect of the present disclosure.

FIG. 1 illustrates an example setting of a physical topology of an enterprise network, according to one aspect of the present disclosure;

The concepts of the present disclosure may be implemented in a controlled network of access points in a campus network that provide network connectivity to client devices connected thereto. Such network of access points may be managed by a network controller (e.g., a Dynamic Network Access Controller (DNAC), a Wireless Local Area Network Controller (WLC), etc., examples of which will be described below.

FIG. 1 illustrates an example setting 100 that includes a physical topology of an enterprise network 101 for providing networking and optionally a cloud-base applications 150 accessible via enterprise network 101. It should be understood that, for the enterprise network 101 and any network discussed herein, there can be additional or fewer nodes, devices, links, networks, or components in similar or alternative configurations. Example embodiments with different numbers and/or types of endpoints, nodes, cloud components, servers, software components, devices, virtual or physical resources, configurations, topologies, services, appliances, or deployments are also contemplated herein. Further, the enterprise network 101 can include any number or type of resources, which can be accessed and utilized by endpoints or network devices. The illustrations and examples provided herein are for clarity and simplicity.

In this example, the enterprise network 101 includes a management cloud 102 and a network fabric 120. Although shown as an external network or cloud to the network fabric 120 in this example, the management cloud 102 may alternatively or additionally reside on the premises of an organization or in a colocation center (in addition to being hosted by a cloud provider or similar environment). The management cloud 102 can provide a central management plane for building and operating the network fabric 120. The management cloud 102 can be responsible for forwarding configuration and policy distribution, as well as device management and analytics. The management cloud 102 can comprise one or more network controller appliances 104, one or more authentication, authorization, and accounting (AAA) appliances 106, one or more wireless local area network controllers (WLCs) 108, and one or more fabric control plane nodes 110. In other example embodiments, one or more elements of the management cloud 102 may be co-located with the network fabric 120.

The network controller appliance(s) 104 can function as the command and control system for one or more network fabrics, and can house automated workflows for deploying and managing the network fabric(s). The network controller appliance(s) 104 can include automation, design, policy, provisioning, and assurance capabilities, among others, as discussed further below with respect to FIG. 2. In some example embodiments, one or more Cisco Digital Network Architecture (Cisco DNA™) appliances can operate as the network controller appliance(s) 104 and may be referred to as a network controller 104.

The AAA appliance(s) 106 can control access to computing resources, facilitate enforcement of network policies, audit usage, and provide information necessary to bill for services. The AAA appliance can interact with the network controller appliance(s) 104 and with databases and directories containing information for users, devices, things, policies, billing, and similar information to provide authentication, authorization, and accounting services. In some example embodiments, the AAA appliance(s) 106 can utilize Remote Authentication Dial-In User Service (RADIUS) or Diameter to communicate with devices and applications. In some example embodiments, one or more Cisco® Identity Services Engine (ISE) appliances can operate as the AAA appliance(s) 106.

The WLC(s) 108 can support fabric-enabled access points attached to the network fabric 120, handling traditional tasks associated with a WLC as well as interactions with the fabric control plane for wireless endpoint registration and roaming. In some example embodiments, the network fabric 120 can implement a wireless deployment that moves data-plane termination (e.g., VXLAN) from a centralized location (e.g., with previous overlay Control and Provisioning of Wireless Access Points (CAPWAP) deployments) to an access point/fabric edge node. This can enable distributed forwarding and distributed policy application for wireless traffic while retaining the benefits of centralized provisioning and administration. In some example embodiments, one or more Cisco® Wireless Controllers, Cisco® Wireless LAN, and/or other Cisco DNA™-ready wireless controllers can operate as the WLC(s) 108.

The network fabric 120 can comprise fabric border nodes 122A and 122B (collectively, 122), fabric intermediate nodes 124A-D (collectively, 124), and fabric edge nodes 126A-F (collectively, 126). Although the fabric control plane node(s) 110 are shown to be external to the network fabric 120 in this example, in other example embodiments, the fabric control plane node(s) 110 may be co-located with the network fabric 120. In example embodiments where the fabric control plane node(s) 110 are co-located with the network fabric 120, the fabric control plane node(s) 110 may comprise a dedicated node or set of nodes or the functionality of the fabric control node(s) 110 may be implemented by the fabric border nodes 122.

The fabric control plane node(s) 110 can serve as a central database for tracking all users, devices, and things as they attach to the network fabric 120, and as they roam around. The fabric control plane node(s) 110 can allow network infrastructure (e.g., switches, routers, WLCs, etc.) to query the database to determine the locations of users, devices, and things attached to the fabric instead of using a flood and learn mechanism. In this manner, the fabric control plane node(s) 110 can operate as a single source of truth about where every endpoint attached to the network fabric 120 is located at any point in time. In addition to tracking specific endpoints (e.g., /32 address for IPv4, /128 address for IPv6, etc.), the fabric control plane node(s) 110 can also track larger summarized routers (e.g., IP/mask). This flexibility can help in summarization across fabric sites and improve overall scalability.

The fabric border nodes 122 can connect the network fabric 120 to traditional Layer 3 networks (e.g., non-fabric networks) or to different fabric sites. The fabric border nodes 122 can also translate context (e.g., user, device, or thing mapping and identity) from one fabric site to another fabric site or to a traditional network. When the encapsulation is the same across different fabric sites, the translation of fabric context is generally mapped 1:1. The fabric border nodes 122 can also exchange reachability and policy information with fabric control plane nodes of different fabric sites. The fabric border nodes 122 also provide border functions for internal networks and external networks. Internal borders can advertise a defined set of known subnets, such as those leading to a group of branch sites or to a data center. External borders, on the other hand, can advertise unknown destinations (e.g., to the Internet similar in operation to the function of a default route).

The fabric intermediate nodes 124 can operate as pure Layer 3 forwarders that connect the fabric border nodes 122 to the fabric edge nodes 126 and provide the Layer 3 underlay for fabric overlay traffic.

The fabric edge nodes 126 can connect endpoints to the network fabric 120 and can encapsulate/decapsulate and forward traffic from these endpoints to and from the network fabric. The fabric edge nodes 126 may operate at the perimeter of the network fabric 120 and can be the first points for attachment of users, devices, and things and the implementation of policy. In some embodiments, the network fabric 120 can also include fabric extended nodes (not shown) for attaching downstream non-fabric Layer 2 network devices to the network fabric 120 and thereby extend the network fabric. For example, extended nodes can be small switches (e.g., compact switch, industrial Ethernet switch, building automation switch, etc.) which connect to the fabric edge nodes via Layer 2. Devices or things connected to the fabric extended nodes can use the fabric edge nodes 126 for communication to outside subnets.

In this example, the network fabric can represent a single fabric site deployment which can be differentiated from a multi-site fabric deployment.

In some example embodiments, all subnets hosted in a fabric site can be provisioned across every fabric edge node 126 in that fabric site. For example, if the subnet 10.10.10.0/24 is provisioned in a given fabric site, this subnet may be defined across all of the fabric edge nodes 126 in that fabric site, and endpoints located in that subnet can be placed on any fabric edge node 126 in that fabric. This can simplify IP address management and allow deployment of fewer but larger subnets. In some example embodiments, one or more Cisco® Catalyst switches, Cisco Nexus® switches, Cisco Meraki® MS switches, Cisco® Integrated Services Routers (ISRs), Cisco® Aggregation Services Routers (ASRs), Cisco® Enterprise Network Compute Systems (ENCS), Cisco® Cloud Service Virtual Routers (CSRvs), Cisco Integrated Services Virtual Routers (ISRvs), Cisco Meraki® MX appliances, and/or other Cisco DNA-Ready™ devices can operate as the fabric nodes 122, 124, and 126.

The enterprise network 101 can also include wired endpoints 130A, 130C, 130D, and 130F and wireless endpoints 130B and 130E (collectively, 130). The wired endpoints 130A, 130C, 130D, and 130F can connect by wire to fabric edge nodes 126A, 126C, 126D, and 126F, respectively, and the wireless endpoints 130B and 130E can connect wirelessly to wireless access points 128B and 128E (collectively, 128), respectively, which in turn can connect by wire to fabric edge nodes 126B and 126E, respectively. In some example embodiments, Cisco Aironet® access points, Cisco Meraki® MR access points, and/or other Cisco DNA™-ready access points can operate as the wireless access points 128.

The endpoints 130 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 130 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

In some example embodiments, the network fabric 120 can support wired and wireless access as part of a single integrated infrastructure such that connectivity, mobility, and policy enforcement behavior are similar or the same for both wired and wireless endpoints. This can bring a unified experience for users, devices, and things that is independent of the access media.

In integrated wired and wireless deployments, control plane integration can be achieved with the WLC(s) 108 notifying the fabric control plane node(s) 110 of joins, roams, and disconnects by the wireless endpoints 130 such that the fabric control plane node(s) can have connectivity information about both wired and wireless endpoints in the network fabric 120, and can serve as the single source of truth for endpoints connected to the network fabric. For data plane integration, the WLC(s) 108 can instruct the fabric wireless access points 128 to form a VXLAN overlay tunnel to their adjacent fabric edge nodes 126. The AP VXLAN tunnel can carry segmentation and policy information to and from the fabric edge nodes 126, allowing connectivity and functionality identical or similar to that of a wired endpoint. When the wireless endpoints 130 join the network fabric 120 via the fabric wireless access points 128, the WLC(s) 108 can onboard the endpoints into the network fabric 120 and inform the fabric control plane node(s) 110 of the endpoints' Media Access Control (MAC) addresses. The WLC(s) 108 can then instruct the fabric wireless access points 128 to form VXLAN overlay tunnels to the adjacent fabric edge nodes 126. Next, the wireless endpoints 130 can obtain IP addresses for themselves via Dynamic Host Configuration Protocol (DHCP). Once that completes, the fabric edge nodes 126 can register the IP addresses of the wireless endpoint 130 to the fabric control plane node(s) 110 to form a mapping between the endpoints' MAC and IP addresses, and traffic to and from the wireless endpoints 130 can begin to flow.

As noted above, setting 100 also includes cloud based applications 150, which may be accessed/used by one or more users via one or more of end points 130A, 130B, 130C, 130D, 130E and 130F.

Cloud based applications 150 can include a number of different applications such as application 150A and application 150B. A non-limiting example of application 150A or 150B can be a multi-media collaborative application for conducting remote audio/video based collaboration sessions such as Cisco's WebEx application or Cisco's WebEx Teams application. However, such applications can include any other cloud-based application utilized by users via their respective end points.

Cloud-based software applications 150A and 150B can be executed on one or more cloud based servers. Furthermore, each such cloud-based application 150A or 150B can communicate using known or to be developed methods with network controller 104 of enterprise network 101 to provide, anonymously, information and analytics associated with communication sessions (collaborative sessions) established between various end points using application 150A and/or application 150B.

Prior to describing example correlation methods with reference to FIG. 4, it is noted that various components of enterprise network 101 such as routers and switches (e.g. nodes 122, 124 and/or 126 in FIG. 1) and LAN controllers such as WLCs 108 may have installed thereon, intelligent network classifications software such as Cisco's Network Based Application Recognition (NBAR) software, which as will be described below, can detect, in any packet passing therethrough (on its path toward or from end points 130A and 130B during example communication session described above), flow ID generated and embedded therein.

As noted above, the present disclosure provides a unique method of embedding finer grained information such as user identity and application identity (as opposed to only the more general VN and EIG identities) in IPv6 addresses used for end-to-end communications within a network such as enterprise network 101. The finer grained information can be used for improved policy enforcement within enterprise network 101. The modified IPv6 addressed that include the finer grained information are assigned to instances of applications being used and are independent of (not tied to) end terminals and devices used to run such instances of applications.

This method provides a unique identifier for network policy enforcement across enterprise network 101, a finer granularity compared to VNI/SGT for network policy enforcement and use of existing network primitives (routing, forwarding, mobility, segmentation, etc.) for network security and policy enforcement.

Figure 2:
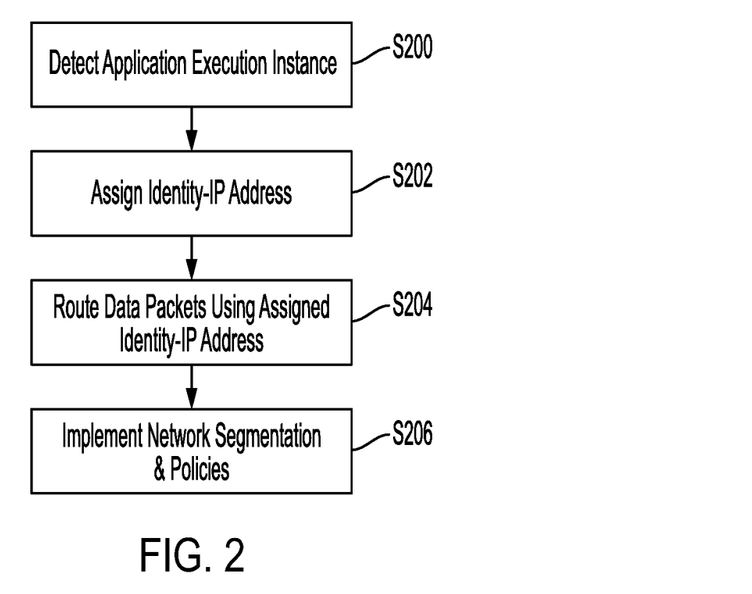
FIG. 2 illustrates a method of enforcing network policy, according to one aspect of the present disclosure.

FIG. 2 illustrates a method of enforcing network policy, according to one aspect of the present disclosure. FIG. 2 will be described from the perspective of network controller such as network controller 104 of network 101. However, it is apparent to those having ordinary skill in the art that network controller 104 may have one or more associated memories on which computer-readable instructions are stored, which when executed by one or more associated processors of network controller 104, configure network controller 104 to perform functionalities described below with reference to FIG. 2. In another example, the process of FIG. 2 may be performed by any one or more components of enterprise network 101 including, but not limited to various switches, routers, WLCs of enterprise network 101 and/or any one of fabric nodes 122, intermediate nodes 124, edge nodes 126 and/or access points 128.

At S200, network controller 104 may receive an indication of an instance of application execution via a given user using a given end point such as one or more of end points 130A, 130B, 130C, 130D, 130E and 130F (end points 130). In one example, this indication of application execution may be received at an edge gateway of enterprise network 101 such as any one of edge nodes 126 using any classification framework (e.g., Cisco NBAR) and Source Network Address Translation (SNAT) with the detected application identifier, or directly at an end client, e.g., using Cisco AnyConnect as proposed in TF3151 at one or more of end points such as end points 130.

At S202, network controller 104 assigns an IPv6 address to the instance of an application, the execution of which is detected at S200. This IPv6 address, as will be described below, includes finer grained information including user and application identities for network policy enforcement and hence may be referred to as identity-IP address. Furthermore, such identity-IP address is not tied to any particular end terminal 130 via which application execution is requested and hence is device independent.

While IPv6 is used as an example IP address in which user and application identities can be encoded/embedded for finer grained network security/policy enforcements, the present disclosure is not limited thereto and any other known or to be developed IP address/network identifier in which user and policy information can be embedded, may be used instead of and/or in conjunction with specific IPv6 example used herein.

In one example, for assigning an identity-IPv6, the DHCP client identifier option is used whereby, upon reception by a DHCP server associated with enterprise network 101, the client identifier is transferred to an identity handling system (e.g., Cisco ISE/AAA appliance(s) 106 or any Lightweight Directory Access Protocol (LDAP)-based system), which replies with a corresponding identity IP-address. In one example, for security and against replay attacks, a token identifier can be generated using OTP applications (e.g., SoftToken, MobilePass, etc.). The DHCP client (e.g., integrated into any on-device Cisco agent such as AnyConnect) would ask the user of the corresponding end point terminal 130 for said token before sending the DHCP request.

In one example, each assigned identity-IP address may include a user (person) ID and an application ID on top of Group ID, where the Group ID itself may include two hierarchical fields such as VXLAN Network Identifier (VNI) size and Scalable Group Tags (SGT).

Each assigned identity-IP address may be segmented in a number of different ways. For example, full address space of identity-IP address can be used as an overlay and 32 bits may be assigned for each one of person ID (user identifier), application ID (application identifier), VNI and SGT (total of 128 bits). This format operates based on Location/ID Separation Protocol (LISP) and isolates internal network by default since network address translation is necessary to communicate with the wide area network.

Another option for segmenting the assigned identity-IP address is to use an allocated subset/address family/private subnet for segmentation in remaining fields after the assigned prefix. For example, if the prefix is 32 bits, 24 bits may be used for VNI, 16 bits may be used for SGT, and 28 bits may be used for person ID and application ID.

Embedding user and application IDs in IP addressed headers provides information about all aspects of a network policy (e.g., source and destination VNI and SGT) in a single unique header and is thus compatible with standard Software Defined Networking (SDN) implementations. In particular, such network policy enforcement based on information embedded in IP addresses works without DPI even over encrypted connections. As an example, exposing application (by including application ID in the IPv6 address) can be used to perform QoS but also to enforce security policies (e.g., Hyper Text Transform Protocol (HTTP) has to go through a proxy, Source Shell (SSH) through an Intrusion Detection System (IDS), etc.)

With an identity-IP addressed assigned to an executed instance of an application at S202, at 5204, corresponding data packets are routed over determined data paths within enterprise network 101. Any network mobility protocol (e.g., LISP, which is already used in Software Defined Access (SDA)) can be used to map these identifier-IPs to network locations. Examples other than LISP include, but are not limited to, Map-Me, Mobile IPv6, etc.

The control plane of these mobility protocols includes identity verification and allows for verifying that the corresponding end point 130 is allowed to use said IP address (and thus rightly belongs to the advertised security group).

Furthermore, the above described identity-IP address is a client-based IP address, which is advantages in cases of mobility, as the client can transport its identity rather than having to recompile it at the gateway at each mobility event (at each different location where the client attempts to connect to enterprise network 101). Another example advantage is preservation of low delays/losses by performing a fast handover during mobility events (e.g., which can be important during business real time communication calls).

With VNI, SGT, person ID and application ID being encoded in the standard source and destination fields of the identity IPv6 header, at S206, network controller 104 uses standard forwarding-plane features (e.g., based on IPv6 Longest-Prefix Match) to implement network segmentation and policies without modifying much of the policy edition toolchain (e.g., SDA, DNAC, Viptela, etc.). In particular, any router/switch such as root nodes 122, intermediate nodes 124, edge nodes 126, etc. can be configured to perform policy actions in the data plane without having to understand the (non-standard) SGT/VNI fields of the VXLAN encapsulation. Accordingly, any equipment with a FIB might be configured to enforce segmentation, thus enlarging the scope of network policy enforcements to legacy devices in a cost effective way.

In one example, segmentation can be easily performed by having, as a default, a rule that indicates addresses that do not share the same prefixes (i.e., VNIs/SGTs) cannot communicate one with another. Furthermore, service access control can be performed by having the service expose one IP address per VNI/SGT that is allowed to access the service. Hence, requests from users in another VNI/SGT will be dropped as part of the default drop policy for enterprise network 101.

Figure 3:
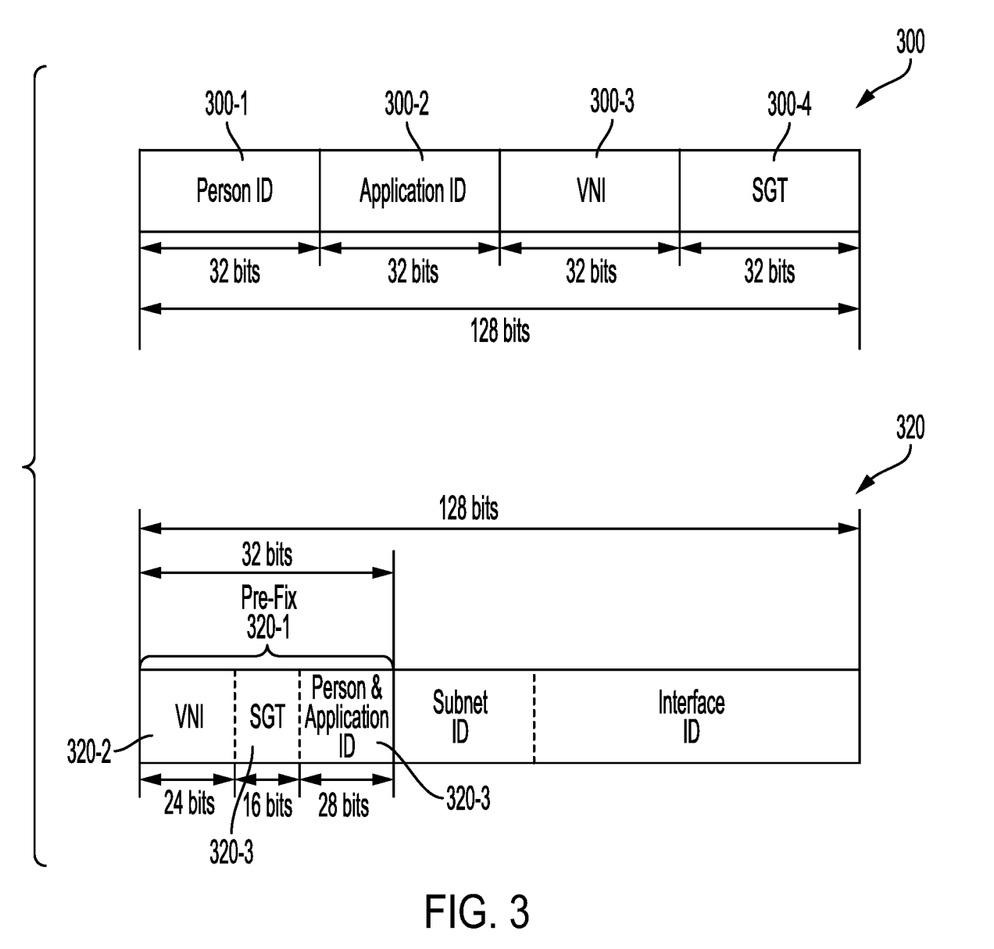
FIG. 3 illustrates an example structure of an identity-IP address for use in enforcing network policy of FIG. 2, according to one aspect of the present disclosure.

FIG. 3 illustrates an example structure of an identity-IP address for use in enforcing network policy of FIG. 2, according to one aspect of the present disclosure. As noted above, the space of each assigned identity-IP address may be segmented in a number of different ways. IPv6 address 300 illustrates one possibility where entire 128 bits of IPv6 address is used as an overlay and is evenly divided where 32 bits are used for encoding each one of person ID (300-1), application ID (300-2), VNI (300-3) and SGT (300-4). An IPv6 address is represented as eight groups of four hexadecimal digits, each group representing 16 bits (two octets, a group sometimes also called a hextet). The groups are separated by colons (:). Accordingly, each one of identifiers 300-1, 300-2, 300-3 and 300-4 are represented by two groups of hexadecimal digits.

Another possibility is IPv6 address 320, where prefix 320-1 is used to encode all four person ID, application ID, VNI and SGT and remaining bits are used for subnet ID, interface ID, etc., As shown prefix 320-1 is split such that 24 bits are used for VNI (320-2), 16 bits are used for SGT (320-3) and 28 bits are used to encode person ID and application ID (320-4).

With above description, the disclosure now turns to describing example device/system structures that can be used as network controller 104, various switches, routers, WLCs of enterprise network 101 and/or any one of end points 130A, 130B, 130C, 130D, 130E and 130F for implementing the process of FIG. 2.

The used of the above proposed identity-IP address scheme provides several security advantages. For example, client authentication and posture verification are performed using on-device trusted software (e.g., AnyConnect), protection against replay attacks are ensured using 2 Factor Authentication (2FA) and One Time Password (OTP) (e.g., Mobile Pass, Soft Token) and security is naturally transported with mobility using standard mobility authentication protocols where routes are only constructed using the authenticated mobility protocol, so spoofing addresses is impossible. Furthermore, encoding person and application identities in IP addresses presents possibilities for supporting multiple VNI/SGTs on the same device using multiple IPv6 addresses and multi-prefix/multi-homing protocols and group communications using native IP multicast since the group information is exposed as a prefix in the mobility control plane.

Figure 4:
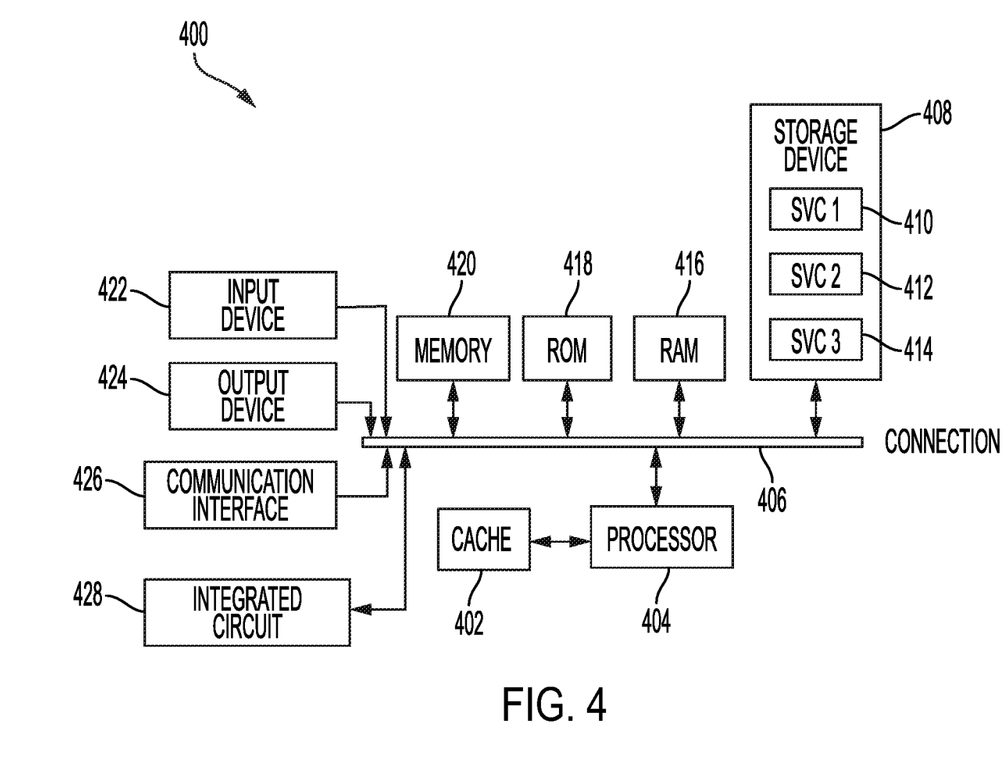
FIG. 4 illustrates an example system including various hardware computing components, according to an aspect of the present disclosure.

FIG. 4 illustrates an example system including various hardware computing components, according to an aspect of the present disclosure. The more appropriate embodiment will be apparent to those of ordinary skill in the art when practicing the present technology. Persons of ordinary skill in the art will also readily appreciate that other system embodiments are possible.

FIG. 4 illustrates system bus computing system architecture (system) 400 wherein the components of the system are in electrical communication with each other using a connection 406. Exemplary system 400 includes a cache 402 and a processing unit (CPU or processor) 404 and a system connection 406 that couples various system components including the system memory 420, such as read only memory (ROM) 418 and random access memory (RAM) 416, to the processor 404. System 400 can include a cache of high-speed memory connected directly with, in close proximity to, or integrated as part of the processor 404. System 400 can copy data from the memory 420 and/or the storage device 408 to the cache 402 for quick access by the processor 404. In this way, the cache can provide a performance boost that avoids processor 404 delays while waiting for data. These and other modules can control or be configured to control the processor 404 to perform various actions. Other system memory 420 may be available for use as well. The memory 420 can include multiple different types of memory with different performance characteristics. The processor 404 can include any general purpose processor and a service component, such as service (SVC) 1 410, service (SVC) 2 412, and service (SVC) 3 414 stored in storage device 408, configured to control the processor 404 as well as a special-purpose processor where software instructions are incorporated into the actual processor design. The processor 404 may essentially be a completely self-contained computing system, containing multiple cores or processors, a bus, memory controller, cache, etc. A multi-core processor may be symmetric or asymmetric.

To enable user interaction with system 400, an input device 422 can represent any number of input mechanisms, such as a microphone for speech, a touch-sensitive screen for gesture or graphical input, keyboard, mouse, motion input, speech and so forth. An output device 424 can also be one or more of a number of output mechanisms known to those of skill in the art. In some instances, multimodal systems can enable a user to provide multiple types of input to communicate with system 400. The communications interface 426 can generally govern and manage the user input and system output. There is no restriction on operating on any particular hardware arrangement and therefore the basic features here may easily be substituted for improved hardware or firmware arrangements as they are developed.

Storage device 408 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 416, read only memory (ROM) 418, and hybrids thereof.

System 400 can include an integrated circuit 428, such as an application-specific integrated circuit (ASIC) configured to perform various operations. The integrated circuit 428 can be coupled with the connection 406 in order to communicate with other components in system 400.

The storage device 408 can include software services 410, 412, 414 for controlling the processor 404. Other hardware or software modules are contemplated. The storage device 408 can be connected to the system connection 406. In one aspect, a hardware module that performs a particular function can include the software component stored in a computer-readable medium in connection with the necessary hardware components, such as the processor 404, connection 406, output device 424, and so forth, to carry out the function.

For clarity of explanation, in some instances the present technology may be presented as including individual functional blocks including functional blocks comprising devices, device components, steps or routines in a method embodied in software, or combinations of hardware and software.

In some example embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

The invention claimed is:

1. A method comprising:
generating an address that is an IPv6 address and is application specific and device independent by embedding a user identifier and an application identifier into the IPv6 address for network policy enforcement in an end-to-end communication within a network;
assigning the address to an application used in the end-to-end communication independent from a specific terminal either requesting access to the application or accessing the application; and
performing network segmentation and the network policy enforcement within the network using the address encoded in either or both source and destination fields of corresponding IPv6 headers in one or more data packets transmitted in the end-to-end communication.

2. The method of claim 1, wherein the address further includes a group identifier for the network policy enforcement.

3. The method of claim 2, wherein the group identifier includes same VXLAN Network Identifier (VNI) size and Scalable Group Tags (SGT).

4. The method of claim 2, wherein the user identifier, the application identifier and the group identifier are included in a prefix of the address.

5. The method of claim 1, further comprising:
detecting an execution instance of the application at an edge router of the network.

6. The method of claim 1, wherein the address is generated using an identity service engine associated with the network.

7. The method of claim 1, further comprising:
routing data packets within the network using the address and a network mobility protocol for mapping the address to one or more network locations.

8. A network controller comprising:
memory having computer-readable instructions stored therein; and
one or more processors configured to execute the computer-readable instructions to:
generate an address that is an IPv6 address and is application specific and device independent by embedding a user identifier and an application identifier into the IPv6 address for network policy enforcement in an end-to-end communication within a network;
assign the address to an application used in the end-to-end communication independent from a specific terminal either requesting access to the application or accessing the application; and
perform network segmentation and the network policy enforcement within the network using the address encoded in either or both source and destination fields of corresponding IPv6 headers in one or more data packets transmitted in the end-to-end communication.

9. The network controller of claim 8, wherein the address further includes a group identifier for the network policy enforcement.

10. The network controller of claim 9, wherein the group identifier includes same VXLAN Network Identifier (VNI) size and Scalable Group Tags (SGT).

11. The network controller of claim 9, wherein the user identifier, the application identifier and the group identifier are included in a prefix of the address.

12. The network controller of claim 8, wherein the one or more processors are further configured to execute the computer-readable instructions to detect an execution instance of the application at an edge router of the network.

13. The network controller of claim 8, wherein the address is generated using an identity service engine associated with the network.

14. The network controller of claim 8, wherein the one or more processors are further configured to execute the computer-readable instructions to route data packets within the network using the address and a network mobility protocol for mapping the address to one or more network locations.

15. One or more non-transitory computer-readable media comprising computer-readable instructions, which when executed by one or more processors, cause the one or more processors to:
generate an address that is and IPv6 address and is application specific and device independent by embedding a user identifier and an application identifier into the IPv6 address for network policy enforcement in an end-to-end communication within a network;
assign the address to an application used in the end-to-end communication independent from a specific terminal either requesting access to the application or accessing the application; and
perform network segmentation and the network policy enforcement within the network using the address encoded in either or both source and destination fields of corresponding IPv6 headers in one or more data packets transmitted in the end-to-end communication.

16. The one or more non-transitory computer-readable media of claim 15, wherein the address further includes a group identifier for the network policy enforcement, the group identifier includes same VXLAN Network Identifier (VNI) size and Scalable Group Tags (SGT).

17. The one or more non-transitory computer-readable media of claim 15, wherein the one or more processors are further configured to execute the computer-readable instructions to detect an execution instance of the application at an edge router of the network.

18. The one or more non-transitory computer-readable media of claim 15, wherein the user identifier and the application identifier are included in a prefix of the address.

19. The one or more non-transitory computer-readable media of claim 18, wherein the address includes a group identifier for the network policy enforcement that is included in the prefix of the address.

20. The one or more non-transitory computer-readable media of claim 15, wherein the address is generated using an identity service engine associated with the network.

* * * * *